US012755447B2

(12) United States Patent
Bao et al.

(10) Patent No.: US 12,755,447 B2
(45) Date of Patent: Oct. 6, 2026

(54) AUGMENTING TRAINING DATA BY RECOLORING IMAGES

(71) Applicant: Google LLC, Mountain View, CA (US)

(72) Inventors: Yanan Bao, Sunnyvale, CA (US); Carlos Marcel Alfonso Puyat, Mountain View, CA (US); Karen Linh Truong, San Diego, CA (US); Louis Yang, San Jose, CA (US); Huizhong Chen, Los Altos, CA (US); Zhen Hao Zhou, Sunnyvale, CA (US); Thomas Joseph Duerig, La Jolla, CA (US)

(73) Assignee: Google LLC, Mountain View, CA (US)

( * ) Notice: Subject to any disclaimer, the term of this patent is extended or adjusted under 35 U.S.C. 154(b) by 253 days.

(21) Appl. No.: 18/626,179

(22) Filed: Apr. 3, 2024

(65) Prior Publication Data

US 2025/0315992 A1 Oct. 9, 2025

(51) Int. Cl.

| | |
|---|---|
| ***G06T 11/10*** | (2026.01) |
| ***G06T 3/40*** | (2006.01) |
| ***G06T 7/90*** | (2017.01) |

(52) U.S. Cl.

CPC ................ *G06T 11/10* (2026.01); *G06T 3/40* (2013.01); *G06T 7/90* (2017.01); (Continued)

(58) Field of Classification Search

CPC ... G06T 11/10; G06T 3/40; G06T 7/90; G06T 2207/10024; G06T 2207/20081; G06T 2207/20221; G06T 11/00; G06T 3/4046; G06T 5/60; G06T 9/002; G06T 2207/20076; G06T 2207/20084; G06T 2211/441; G06T 11/001; G06T 11/40; (Continued)

(56) References Cited

U.S. PATENT DOCUMENTS

2017/0116765 A1 4/2017 Chamaret et al.
2021/0201071 A1* 7/2021 Liao ........................ G06T 11/10
(Continued)

FOREIGN PATENT DOCUMENTS

CN 111062862 A * 4/2020 ............... G06T 7/11
CN 114067014 A 2/2022

OTHER PUBLICATIONS

Extended European Search Report in European Appln. No. 25168399.1, mailed on Jul. 17, 2025, 10 pages.
(Continued)

*Primary Examiner* — Jose L Couso
(74) *Attorney, Agent, or Firm* — Fish & Richardson P.C.

(57) ABSTRACT

Methods, systems, and apparatus, including computer programs encoded on computer storage media, for generating, using one or more coloraF_ization models, an augmented set of training data. One of the methods includes receiving a plurality of training examples for training an image processing model, each training example comprising an image and a corresponding ground-truth output for the image; generating, for each image, a respective grayscale image; generating, for each respective grayscale image, one or more recolored images using one or more colorization models; and generating an augmented set of training data for training the image processing model that comprises a plurality of additional training examples.

20 Claims, 5 Drawing Sheets

(52) U.S. Cl.
CPC ............... *G06T 2207/10024* (2013.01); *G06T 2207/20081* (2013.01); *G06T 2207/20221* (2013.01)

(58) Field of Classification Search
CPC ... G06T 7/74; G06T 5/77; G06N 3/02; G06N 3/08–088; G06N 3/04; G06N 3/0445; G06N 3/0454; G06N 3/0464; G06N 3/4046; G06N 3/4053; G06N 3/049; G06N 3/0499; G06N 7/00; G06N 7/01; G06N 20/00; G06K 7/1482; G06V 10/454; G06V 10/54; G06V 10/7764; G06V 10/774; G06V 10/82; G06V 10/84; G06V 20/41; G06V 30/18057; G06V 20/698; G06V 30/19173; G06V 30/194; G06V 10/56; G06F 18/213; G06F 18/214; G06F 18/22; G06F 18/241; G06F 18/24; G06F 18/2411; G06F 18/2415; G06F 18/253; G06F 30/27; Y10S 128/925; H04N 1/6027; H04N 9/64
See application file for complete search history.

(56) References Cited

U.S. PATENT DOCUMENTS

| | | | | |
|---|---|---|---|---|
| 2022/0391766 | A1 | 12/2022 | Marrero et al. | |
| 2023/0055204 | A1 | 2/2023 | Ungureanu et al. | |
| 2025/0046055 | A1 * | 2/2025 | Zhang | G06V 10/60 |

OTHER PUBLICATIONS

Johari et al., "Context-aware colorization of gray-scale images utilizing a cycle-consistent generative adversarial network architecture," Neurocomputing, May 2020, 407:94-104.

Deng et al., "Image-image domain adaptation with preserved self-similarity and domain-dissimilarity for person re-identification," Paper, Presented at the Proceedings of the IEEE/CVF Conference: Computer Vision and Pattern Recognition, Salt Lake City, UT, Jun. 18-23, 2018, pp. 994-1003.

Goled, "Closing the gap between real and synthetic data," Feb. 15, 2022, retrieved on Apr. 18, 2025, retrieved from URL<https://analyticsindiamag.com/closing-the-gap-between-real-and-synthetic-data/#:~:text=This%20domain>, 6 pages.

Liu et al., "Improved Diffusion-based Image Colorization via Piggybacked Models," CoRR, Submitted on Apr. 21, 2023, arXiv:2304.11105v1, 17 pages.

Liu et al., "Unsupervised Sketch-to-Photo Synthesis," CoRR, Submitted on Mar. 23, 2020, arXiv:1909.08313v3, pp. 1-23.

Saharia et al., "Palette: Image-to-image diffusion models," Paper, Presented at Proceedings of the ACM SIGGRAPH, Vancouver, Canada, Aug. 7-11, 2022, 10 pages.

Tobin et al., "Domain randomization for transferring deep neural networks from simulation to the real world," Paper, Presented at Proceedings of the 2017 international conference on intelligent robots and systems, Vancouver, Canada, Sep. 24-28, 2017, pp. 23-30.

Tremblay et al., "Training Deep Networks with Synthetic Data: Bridging the Reality Gap by Domain Randomization," Paper, Presented at the Proceedings of the IEEE/CVF Conference: Computer Vision and Pattern Recognition, Salt Lake City, UT, Jun. 18-23, 2018, pp. 1082-1090.

Wood et al., "Fake it till you make it: face analysis in the wild using synthetic data alone," Paper, Presented at Proceedings of the IEEE/CVF Conference: Computer Vision and Pattern Recognition, Nashville, TN, Jun. 20-25, 2021, pp. 3681-3691.

Zhong et al., "Grayscale enhancement colorization network for visible-infrared person re-identification," IEEE Transactions on Circuits and Systems for Video Technology, Mar. 2022, 32(3):1418-1430.

* cited by examiner

AUGMENTING TRAINING DATA BY RECOLORING IMAGES

BACKGROUND

This specification relates to processing data using machine learning models.

Machine learning models receive an input and generate an output, e.g., a predicted output, based on the received input. Some machine learning models are parametric models and generate the output based on the received input and on values of the parameters of the model.

Some machine learning models are deep models that employ multiple layers of models to generate an output for a received input. For example, a deep neural network is a deep machine learning model that includes an output layer and one or more hidden layers that each apply a non-linear transformation to a received input to generate an output.

SUMMARY

This specification generally describes a system implemented as computer programs on one or more computers in one or more locations for generating, using one or more colorization models, an augmented set of training data for training an image processing model.

In general, one innovative aspect of the subject matter described in this specification can be embodied in methods that include the actions of receiving a plurality of training examples for training an image processing model, each training example comprising an image and a corresponding ground-truth output for the image; generating, for each image, a respective grayscale image; generating, for each respective grayscale image, one or more recolored images using one or more colorization models; and generating an augmented set of training data for training the image processing model that comprises a plurality of additional training examples, each additional training example comprising a respective recolored image generated from a respective image and the corresponding ground-truth output for the respective image.

In some implementations, the method further comprises training the image processing model on the augmented set of training data.

In some implementations, the augmented set of training data further comprises the plurality of training examples.

In some implementations, each image comprises a synthetic image.

In some implementations, the synthetic image comprises a rendered image.

In some implementations, each of the one or more colorization models comprises an image-to-image diffusion model.

In some implementations, generating, for each respective grayscale image, one or more recolored images using one or more colorization models comprises:

generating each of the one or more recolored images by sampling from the one or more colorization models given the respective grayscale image.

In some implementations, the one or more colorization models comprise a sequence of colorization models, and generating, for each respective grayscale image, one or more recolored images using one or more colorization models comprises: for each respective grayscale image; generating an initial recolored image using a first colorization model in the sequence of colorization models given a first grayscale image derived from the respective grayscale image; and for each subsequent colorization model in the sequence of colorization models: providing an input recolored image and a respective intermediate grayscale image derived from the respective grayscale image for the subsequent colorization model as input to the subsequent colorization model to generate a respective intermediate recolored image, wherein the input recolored image is generated as output by a preceding colorization model in the sequence, and wherein the one or more recolored images comprise the respective intermediate recolored image generated by a last colorization model of the sequence of colorization models.

In some implementations, each subsequent colorization model generates images of a corresponding resolution, and wherein the respective intermediate grayscale image for the subsequent colorization model has the corresponding resolution.

In some implementations, the one or more colorization models have been trained on training data comprising real images.

In some implementations, the image processing model performs an image processing task comprising any one or more of: image segmentation, object detection, or object recognition.

Other embodiments of this aspect include corresponding computer systems, apparatus, and computer programs recorded on one or more computer storage devices, each configured to perform the actions of the methods. Particular embodiments of the subject matter described in this specification can be implemented so as to realize one or more of the following advantages.

The system described in this specification augments a set of training data for training an image processing model by generating modified versions of images in the set of training data. For example, the system can receive training examples for training the image processing model that each include an image and a corresponding ground-truth output for the image. The image can be in a first colorization scheme. For example, the image can be an RGB image. The system can generate a modified image in a second colorization scheme for each image of the training examples. For example, the system can generate a grayscale image for each RGB image. The system can generate one or more images in the first colorization scheme for each modified image. For example, the system can use one or more colorization models to generate one or more recolored images in the first colorization scheme from the modified image in the second colorization scheme. For example, the system can use one or more colorization models to generate one or more recolored RGB images for each grayscale image. Each of the recolored images is a version of the grayscale image with different colors. The system can then generate an augmented set of training data that includes additional training examples that include the recolored images. The augmented set of training data can be used to train the image processing model. This specification describes RGB and grayscale images as an example, but the system can process and generate any appropriate type of image such as other types of colored images, hyperspectral, multispectral, infrared, and binary images.

By training the image processing model on the augmented set of training data, the image processing model performs better at inference compared to an image processing model that is trained on the original set of training data. For example, training image processing models to perform tasks such as image segmentation, object detection, or object recognition, requires a large set of training data. By augmenting the set of training data with different versions of the images of the original set of training data, the system increases the number of training examples available for training, resulting in improved training and performance of the image processing model.

In addition, obtaining a sufficient number of training examples that each include labeled real images for the task requires a large amount of computing time and/or resources. Thus the training examples of the original training data may include synthetically generated training data. For example, the synthetically generated training data can include synthetic images generated from 3D rendering, simulations, and/or generative models. However, the synthetically generated images may not be representative of real-world images. Thus, image processing models trained on synthetically generated images that are not representative of real-world images may not perform well when used at inference to process a real-world image, resulting in a domain gap. Some conventional techniques for addressing the domain gap include data mixing and multi-stage training, domain adaptation, and domain randomization for the machine learning model being trained. However, the conventional techniques focus only on specific domains such as person re-identification, facial analysis, and robotics. The conventional techniques may thus not be applicable to a wide variety of situations or image processing tasks.

The system described in this specification uses colorization models to generate recolored versions of synthetic images for a variety of domains and situations that include different variations of colors of the synthetically generated image. In some examples, the recolored version of a synthetically generated image can be more photorealistic than the synthetically generated image. For example, the recolored version can include colors that are similar to the colors that would be found in real images. The colorization models can have been trained on real images to generate photorealistic recolored images. The system can then generate additional training examples using the recolored images and the ground-truth outputs for the synthetically generated images. By re-using the ground-truth outputs, the system can generate additional training examples for a variety of tasks, resulting in a larger number and variation of training examples that allows the image processing model to generalize across domains and situations.

In some implementations, the system described in this specification can generate a recolored image from lower resolution recolored images, resulting in a more detailed and information-dense recolored image for training the image processing model. For example, the system can use a sequence of colorization models. The system can use the first colorization model in the sequence to generate a first recolored image from a first image in the second colorization scheme, e.g., a first grayscale image. The system can use each subsequent colorization model in the sequence to generate progressively larger versions of the first recolored image. The system can thus provide an augmented set of training data that includes high resolution images for training the image processing model, which can further improve the performance of the image processing model.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
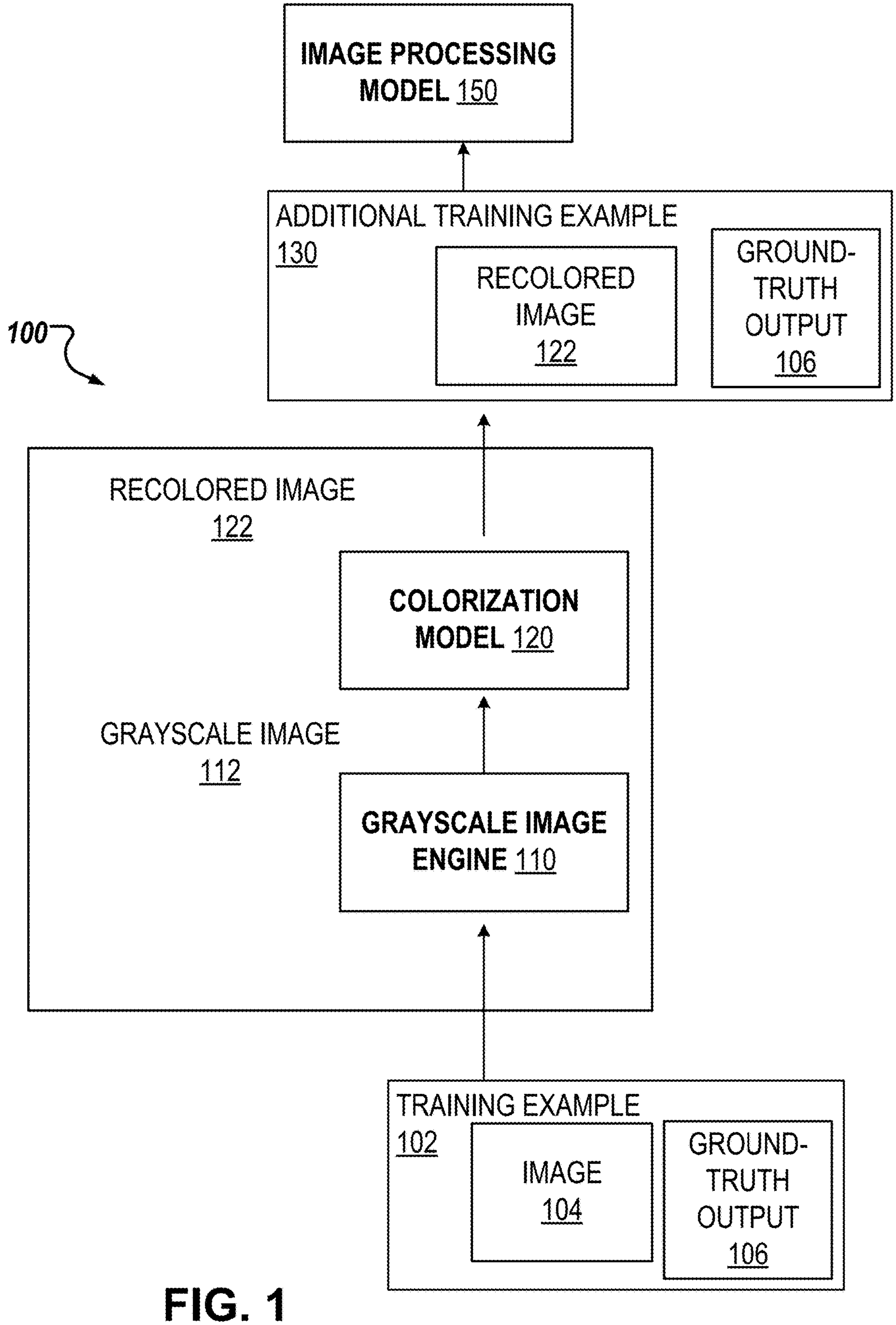
FIG. 1 shows an example system for generating an augmented set of training data.

FIG. 1 shows an example system 100 for generating an augmented set of training data. The system 100 is an example of a system implemented as computer programs on one or more computers in one or more locations in which the systems, components, and techniques described below are implemented.

The system 100 receives an initial set of training data for training an image processing model 150. The image processing model 150 can be configured to process an image in accordance with current values of parameters of the image processing model 150 to generate an output. For example, the image processing model 150 can be configured to receive an input image and to process the input image, i.e., to process the intensity values of the pixels of the input image, to generate an output for the input image. For example, the task may be image classification and the output for a given image may be scores for each of a set of object categories, with each score representing an estimated likelihood that the image contains an image of an object belonging to the category. As another example, the task can be object detection and the output can identify locations in the input image at which particular types of objects are depicted. As yet another example, the task can be image segmentation and the output can assign each pixel of the input image to a category from a set of categories. Example outputs for an image segmentation task are described below with reference to FIG. 4.

The image processing model 150 can have any appropriate architecture for performing an image processing task. For example, the image processing model can be a convolutional neural network (CNN), a U-Net, or a Transformer-based neural network such as a vision transformer (ViT).

The initial set of training data includes multiple input training examples such as the input training example 102. The training example 102 includes an image 104 in a first colorization scheme and a ground-truth output 106. The image 104 includes pixels that each have one or more intensity values. For example, the image 104 can be an RGB image. In the RGB colorization scheme, each pixel can have an intensity value for a red channel, an intensity value for a green channel, and an intensity value for a blue channel. In some examples, the image 104 can be another type of image such as another type of colored image, hyperspectral, multispectral, or binary image. In these examples, the image 104 can be in a different colorization scheme. For example, in the colorization scheme for a hyperspectral image, each pixel can have more than three intensity values. In some examples, the image 104 can be a real image, for example, of a real-world scene. In some examples, the image 104 can be a synthetic image, also referred to as a synthetically-generated image. For example, the synthetic image can depict a rendering of a real-world scene. The synthetic image can be a rendered image, or generated from a simulation or a generative model, for example.

The ground-truth output 106 can include data representing the output that should be generated by the image processing model 150 from the image 104. For example, for an image segmentation task, the ground-truth output 106 can include data representing segmentation masks and/or instances for the image 104.

In some examples, after training the image processing model 150 on the initial set of training data, the image processing model 150 may not perform well at inference. For example, if the initial set of training data includes input training examples where the image 104 is a synthetic image, the image processing model 150 may not perform well on real images. In addition, if the initial set of training data does not include a sufficient number of input training examples, the image processing model 150 may not generalize well on previously unseen inputs.

To improve the performance of the image processing model 150, the system 100 generates an augmented set of training data for training the image processing model 150 given the initial set of training data. The augmented set of training data includes multiple training examples such as the additional training example 130. The augmented set of training data includes a larger number and/or variety of training examples than the initial set of training data. Training the image processing model 150 on the augmented set of training data results in better performance at inference. For example, the augmented set of training data can include training examples that include recolored images in the same colorization scheme as the images of the initial set of training data. For example, the recolored images can have different variations of colors of the synthetic images of the training examples of the initial set of training data. In some examples, the variations are more photorealistic. As another example, an augmented set of training data with a larger number of training examples allows the image processing model 150 to generalize better to previously unseen inputs at inference.

The system 100 generates one or more additional training examples such as the additional training example 130 for each input training example 102. The system can include the additional training examples for the input training examples in the augmented set of training data. In some examples, the system can also include the received training examples of the initial set of training data in the augmented set of training data.

To generate the additional training example 130, the system 100 obtains the training example 102. The training example 102 includes the image 104 in a first colorization scheme, e.g., RGB.

The system 100 processes the image 104 of the training example 102 to generate a modified image that depicts the semantic content of the image 104 in a second, different colorization scheme. As an example, the second colorization scheme can be for another type of image besides an RGB colored image, such as a hyperspectral image, multispectral image, or infrared image. This specification describes the colorization scheme for grayscale as an example second colorization scheme.

For example, the system can use a grayscale image engine 110 to generate a grayscale image 112. In the colorization scheme for grayscale, the grayscale image 112 includes a grayscale intensity value for each pixel.

The grayscale image engine 110 can be configured to generate a grayscale version of the image 104. The grayscale image engine 110 generates the grayscale image 112 from the image 104 by combining, for each pixel of the image 104, the intensity values for the pixel into a grayscale intensity value for the pixel. For example, the grayscale intensity value for the pixel can be an average of the intensity value for the red channel, the intensity value for the green channel, and the intensity value for the blue channel. In some examples, the grayscale intensity value can be a weighted average. For example, the grayscale intensity value can be a weighted average according to a predetermined luminosity formula, such as a weight of 0.3 for the intensity value for the red channel, a weight of 0.59 for the intensity value for the green channel, and a weight of 0.11 for the intensity value for the blue channel.

The system 100 uses a colorization model 120 to generate a recolored image 122 in the first colorization scheme from the modified image in the second colorization scheme. The recolored image 122 is thus in the same colorization scheme as the image 104.

For example, the system 100 can use a colorization model 120 to generate a recolored image 122 from the grayscale image 112. The recolored image 122 can be a colored version of the grayscale image 112. For example, the recolored image 122 can be an RGB image that has the same resolution as the grayscale image 112, but with each pixel having an intensity value for the red channel, an intensity value for the green channel, and an intensity value for the blue channel. Examples of a synthetic RGB image 104, grayscale image 112, and recolored image 122 are described below with reference to FIG. 2.

The colorization model 120 is configured to generate an image in the first colorization scheme that is a version of the modified image. For example, if the image 104 is an RGB image and the recolored image 122 is a grayscale image as described above, the colorization model 120 can be configured to generate an RGB colored version of the grayscale image 112.

The colorization model 120 can be a neural network that is configured to perform an image-to-image translation task. For example, the colorization model 120 can include a diffusion model, a CNN, a Transformer-based neural network, or a generative adversarial network.

In some implementations, the system 100 can use a sequence of colorization models such as the colorization model 120 to generate a recolored image 122 in the first colorization scheme from the modified image. For example, the system 100 can use a sequence of colorization models such as the colorization model 120 to generate a recolored image 122 from the grayscale image 112.

For example, the first colorization model in the sequence can generate an initial recolored image given a first image in the second colorization scheme. For example, the first colorization model in the sequence can generate an initial recolored image given a first grayscale image derived from the grayscale image 112. For example, the first grayscale image may be a downsampled version of the grayscale image 112. The first colorization model can be a colorization model such as the colorization model 120.

Each subsequent colorization model in the sequence can generate an intermediate recolored image given an input recolored image and an intermediate image in the second colorization scheme, e.g., grayscale image. The input recolored image can have been generated as output by a preceding colorization model in the sequence. The intermediate grayscale image may be a downsampled version of the grayscale image 112 that is of higher resolution than the first grayscale image, and any other preceding intermediate grayscale images.

Each of the subsequent colorization models is configured to generate a colored image given two images. For example, each subsequent colorization model is configured to generate an image in the first colorization scheme that is a version of a given image in the second colorization scheme that has colors that are based on a given image in the first colorization scheme. For example, each subsequent colorization model can be configured to generate a colored version of a given grayscale image that has colors that are based on a given colored image. For example, each of the subsequent colorization models can be a neural network that is configured to perform an image-to-image translation task conditioned on multiple input images. Each of the subsequent colorization models can have been trained on training examples that each include a training input of a grayscale image of a particular size and a colored image, and a training output of a colored version of the grayscale image with colors that are based on the colored image of the training input. As an example, each of the subsequent colorization models can include a generative adversarial network or a diffusion model.

The system 100 can thus use the sequence of colorization models to add color at gradually increasing levels of detail to generate the recolored image 122. Generating a recolored image using a sequence of colorization models is described in further detail below with reference to FIG. 3.

The system 100 includes the recolored image 122 and the ground-truth output 106 in the additional training example 130. The system 100 can include the additional training example 130 in the augmented set of training data.

In some examples, the system 100 can generate multiple recolored images such as the recolored image 122 from the modified image in the second colorization scheme, e.g., the grayscale image 112. Each of the multiple recolored images may include different intensity values for the same pixel location. That is, each of the multiple recolored images can be different colored versions of the grayscale image 112. For example, the system 100 can generate each recolored image by sampling from the colorization model 120 given the grayscale image 112. The system 100 can generate an additional training example for each recolored image and include the additional training examples in the augmented set of training data. The system 100 can thus generate an augmented set of training data that includes a larger number and variety of training examples.

In some implementations, the system 100 can train the image processing model 150 on the augmented set of training data. For example, the system 100 can provide the augmented set of training data to a training system within the system 100 or another training system to train the image processing model 150. For example, the training system can process the training examples of the augmented set of training data using the image processing model 150 to determine an update to the parameters of the image processing model 150.

After the image processing model 150 has been trained by the training system on the augmented set of training data, the system 100 or another inference system can use the image processing model 150 to perform image processing tasks. After having been trained on the augmented set of training data, the image processing model 150 can perform better than an image processing model that is trained only on the initial set of training data.

Figure 2:
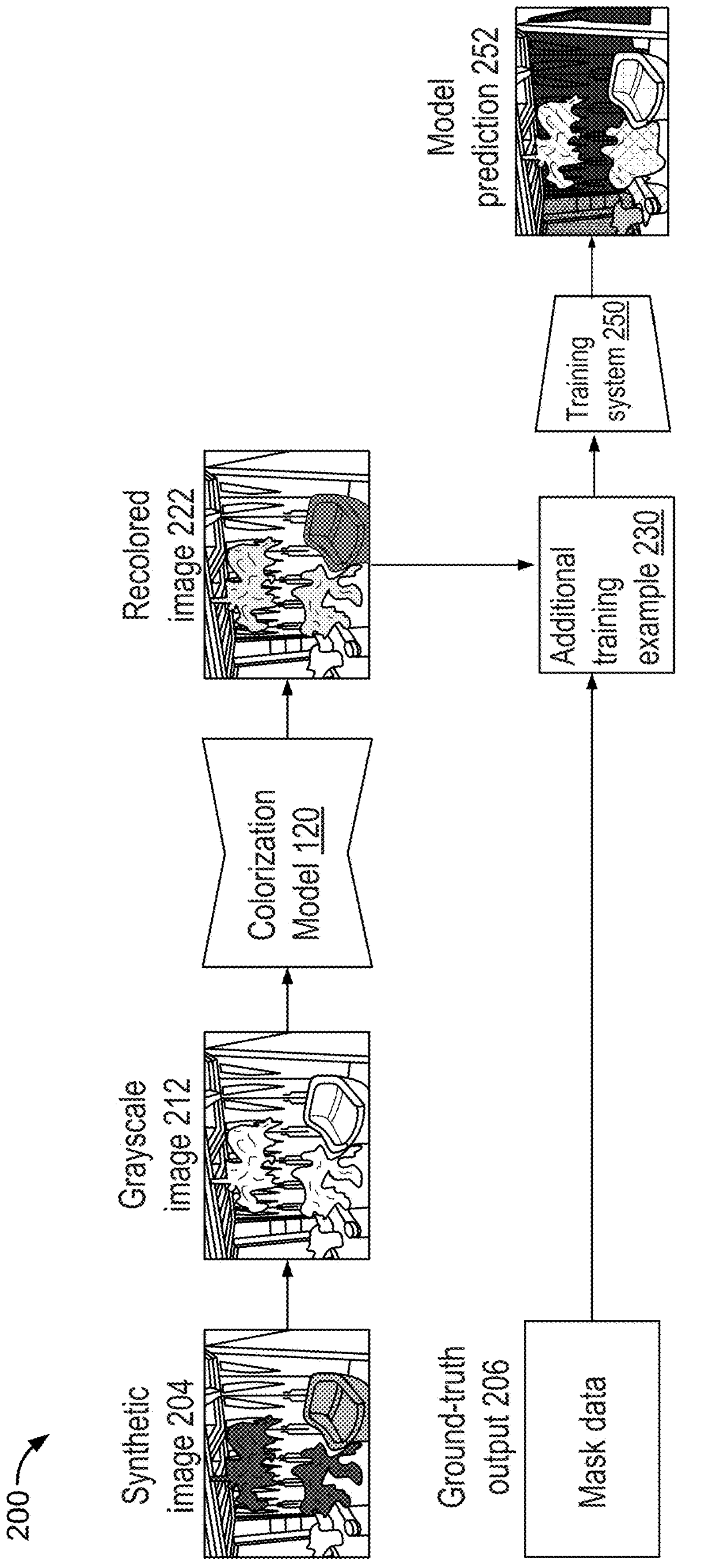
FIG. 2 is a diagram of an example process for generating an additional training example of an augmented set of training data.

FIG. 2 is a diagram of an example process 200 for generating an additional training example 130 of an augmented set of training data. For convenience, the process 200 will be described as being performed by a system of one or more computers located in one or more locations. For example, a system for generating an augmented set of training data, e.g., the system 100 of FIG. 1, appropriately programmed in accordance with this specification, can perform the process 200.

The system receives an image 204 and a ground-truth output 206. The image 204 and the ground-truth output 206 can be part of a training example such as the training example 102 of FIG. 1. The image 204 is an example of the image 104 of FIG. 1, and the ground-truth output 206 is an example of the ground-truth output 106 of FIG. 1.

In the example of FIG. 2, the image 204 is a synthetic RGB image. The image 204 is a rendering of the interior of a room depicting a chair, a table, a floor plant, a hanging plant, two walls, and a ceiling. Colors are depicted in FIG. 2 using shades of gray. For example, the chair is depicted in gray, and the floor plant and hanging plant are depicted in dark gray.

The ground-truth output 206 is a synthetic ground-truth. For example, the ground-truth output 206 can include data for a panoptic segmentation task. The ground-truth output 206 can include mask data that includes a category and an instance identifier for each pixel of the image 204.

In some examples, the ground-truth output 206 can include data for an object detection task. The ground-truth output 206 can include category data and data representing bounding boxes. In some examples, the ground-truth output 206 can include data for a semantic segmentation task. The ground-truth output 206 can include a segmentation mask for the image 204. In some examples, the ground-truth output 206 can include data for an instance segmentation task. The ground-truth output 206 can include mask data that includes segmentation masks for each instance.

The system generates a grayscale image 212 from the synthetic image 204. The grayscale image 212 is an example of the grayscale image 112 of FIG. 1. For example, the grayscale image 212 depicts the same scene as the image 204, but in grayscale. In the example of FIG. 2, the grayscale image 212 is depicted without shading. The system can generate each pixel of the grayscale image 212 by combining the intensity values for the corresponding pixel of the image 204.

The system generates a recolored image 222 by providing the grayscale image 212 to the colorization model 120. The recolored image 222 is an example of the recolored image 122 of FIG. 1. The recolored image 222 depicts the same scene as the grayscale image 212 and the image 204. The recolored image 222 depicts the same scene as the image 204 but with different colors. For example, the chair is depicted in a darker gray than in the image 204, and the hanging plant and floor plant are depicted in a lighter gray than the synthetic image 204. In other examples, the chair can be depicted in multiple colors, such as brown for the armrest and maroon for the seat cushion. In other examples, the floor plant can be depicted in dark green, and the hanging plant can be depicted in light green. In other examples, the leaves of the hanging plant can be depicted in multiple colors.

The recolored image 222 can include different variations of colors than are present in the synthetic image 204. In some examples, the recolored image 222 includes colors that result in a more photorealistic image than the synthetic image 204.

The system generates the additional training example 230. The additional training example 230 is an example of the additional training example 130 of FIG. 1. The additional training example 230 includes the recolored image 222 and the ground-truth output 206.

The system can provide the additional training example 230 as part of the augmented training data to a training system 250. The augmented set of training data can thus include a larger number and/or variety of training examples that results in better generalization abilities for the image processing model. Furthermore, in examples where the recolored image 222 is more realistic than the synthetic image 204, training the image processing model on the augmented set of training data can allow the image processing model to perform better on real images at inference.

The training system 250 can provide the recolored image 222 of the additional training example 230 to the image processing model to obtain the model prediction 252. For example, for a panoptic segmentation task, the model prediction 252 can include mask data that includes a category and an instance identifier for each pixel of the recolored image 222. In the example of FIG. 2, the different instances identified by the output of the image processing model, such as the chair, table, floor plant, hanging plant, and two walls, are depicted using different patterns.

The training system 250 can use the model predictions and the ground-truth outputs for the training examples of the augmented training data to determine an update to the parameters of the image processing model at each of multiple training stages.

Figure 3:
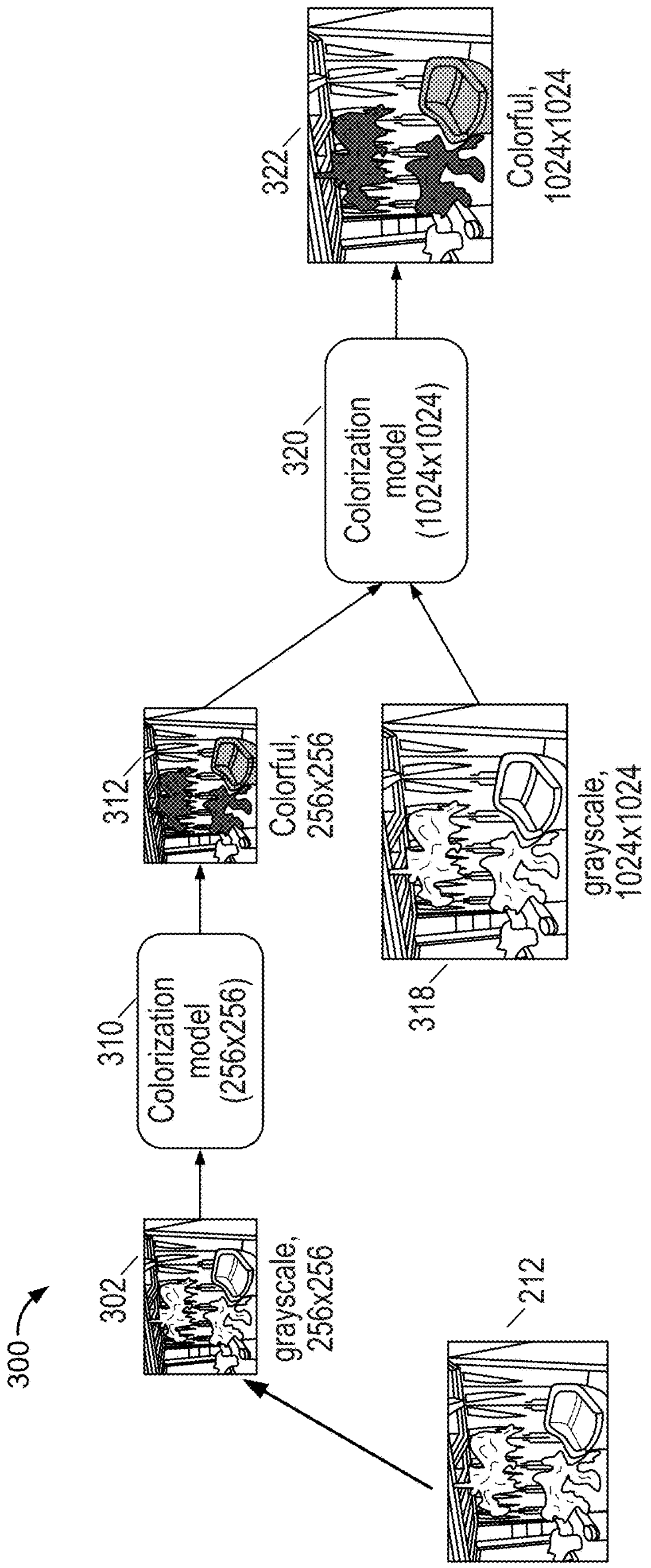
FIG. 3 is a diagram of an example process for generating a recolored image.

FIG. 3 is a diagram of an example process 300 for generating a recolored image using a sequence of colorization models. For convenience, the process 300 will be described as being performed by a system of one or more computers located in one or more locations. For example, a system for generating an augmented set of training data, e.g., the system 100 of FIG. 1, appropriately programmed in accordance with this specification, can perform the process 300. In the example of FIG. 3, the sequence of colorization models includes two colorization models 310 and 320.

The system obtains a grayscale image 212. The system can generate the grayscale image 212 from an image of a training example as described above with reference to FIGS. 1-2.

The system obtains a first grayscale image 302. The system can derive the first grayscale image 302 from the grayscale image 212.

In some examples, the first grayscale image 302 is a downsampled version of the grayscale image 212. For example, the grayscale image 212 can have a resolution of 1024×1024. The system can derive the first grayscale image 302 by reducing the resolution of the grayscale image 212 to a resolution of 256×256.

In some examples, the first grayscale image 302 is the grayscale image 212. For example, the grayscale image 212 can have a resolution of 256×256.

The system can provide the first grayscale image 302 as input to the colorization model 310 to generate an initial recolored image 312. The colorization model 310 is an example of the colorization model 120 of FIG. 1. The colorization model 310 can be configured to generate a recolored image of the same resolution as the given image. For example, the initial recolored image 312 can have a resolution of 256×256.

The system can provide an input recolored image and an intermediate grayscale image to each subsequent colorization model in the sequence to generate an intermediate recolored image.

In the example of FIG. 2, the sequence includes one subsequent colorization model 320. The system can provide the recolored image 312 generated by the colorization model 310 as the input recolored image, and the grayscale image 318 as the intermediate grayscale image, to the colorization model 320.

The system can derive the intermediate grayscale image 318 from the grayscale image 212. In the example of FIG. 2, the intermediate grayscale image 318 can be the grayscale image 212. For example, the grayscale image 212 can have a resolution of 1024×1024, and the intermediate grayscale image 318 can be the same image.

In some examples, the intermediate grayscale image 318 can be a downsampled version of the grayscale image 212. For example, the grayscale image 212 can have a resolution of 2048×2048. The system can derive the intermediate grayscale image 318 by reducing the resolution of the grayscale image 212 to a resolution of 1024×1024.

In some examples, the intermediate grayscale image 318 can be an upsampled version of the grayscale image 212. For example, the grayscale image 212 can have a resolution of 256×256. The system can derive the intermediate grayscale image 318 by increasing the resolution of the grayscale image 212 to a resolution of 1024×1024.

The system can provide the recolored image 312 and the intermediate grayscale image 318 to the colorization model 320 to generate the recolored image 322. The colorization model 320 is configured to generate a colored version of a given grayscale image that has colors that are based on a given colored image. The colorization model 320 is configured to generate images for a corresponding resolution. For example, the colorization model 320 can be configured to generate images that have the same resolution as the intermediate grayscale image.

For example, the colorization model 320 can be configured to generate the recolored image 322 that has the same resolution as the grayscale image 318. In the example of FIG. 3, the recolored image 322 has a resolution of 1024×1024.

The system can use the intermediate recolored image generated by the last colorization model in the sequence as the recolored image to include in an additional training example. The system can thus use the recolored image 322, generated by the last colorization model 320 in the sequence, as the recolored image to include in an additional training example. For example, the system can use the recolored image 322 as the recolored image 222 of FIG. 2.

In some implementations, the system can include a sequence with more than one subsequent colorization model. The input recolored image for each subsequent colorization model can have been generated as output by a preceding colorization model in the sequence. The intermediate grayscale image for each subsequent colorization model can increase in resolution. Each intermediate grayscale image can be derived from the received grayscale image 212. Each subsequent colorization model can be configured to generate a recolored image of the same resolution as the intermediate grayscale image for the subsequent colorization model.

Figure 4:
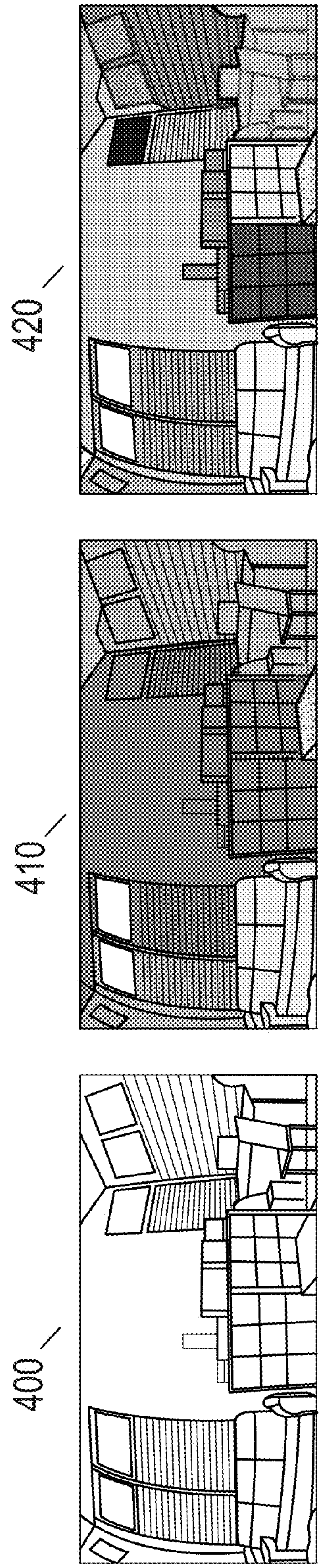
FIG. 4 shows example visualizations of outputs of image processing models.

FIG. 4 shows example visualizations 410 and 420 of outputs of image processing models for an input image 400. The input image 400 is an example real image depicting different instances such as a sofa, multiple windows, two bookshelves, a table, a dining table, and objects on top of the bookshelves.

The image processing models can have been trained to perform panoptic segmentation, for example. The outputs of the image processing models include mask data for each instance of the input image 400 and are visualized in FIG. 4 in different shades and/or patterns. The visualizations 410 and 420 can visualize outputs from image processing models that were trained on different sets of training data.

The visualization 410 visualizes an example output from a first image processing model that was trained on a set of training data that includes only synthetic data. The visualization 410 shows that the first image processing model could not distinguish the two bookshelves and the objects on top of the bookshelves, or the bookshelves and the wall. The visualization 410 also shows that the first image processing model could not distinguish some of the windows and the walls.

The visualization 420 visualizes an example output from a second image processing model that was trained on an augmented set of training data. For example, the augmented set of training data can have been generated from the set of training data for the first image processing model by the system 100 of FIG. 1. The visualization 420 demonstrates the improved segmentation performance of the second image processing model on the input image 400 over the first image processing model. For example, the visualization 420 shows that the second image processing model could distinguish the two bookshelves and the objects on top of the bookshelves. The visualization 420 also shows that the second image processing model could distinguish the bookshelves and the wall, and a larger number of windows and the wall.

Figure 5:
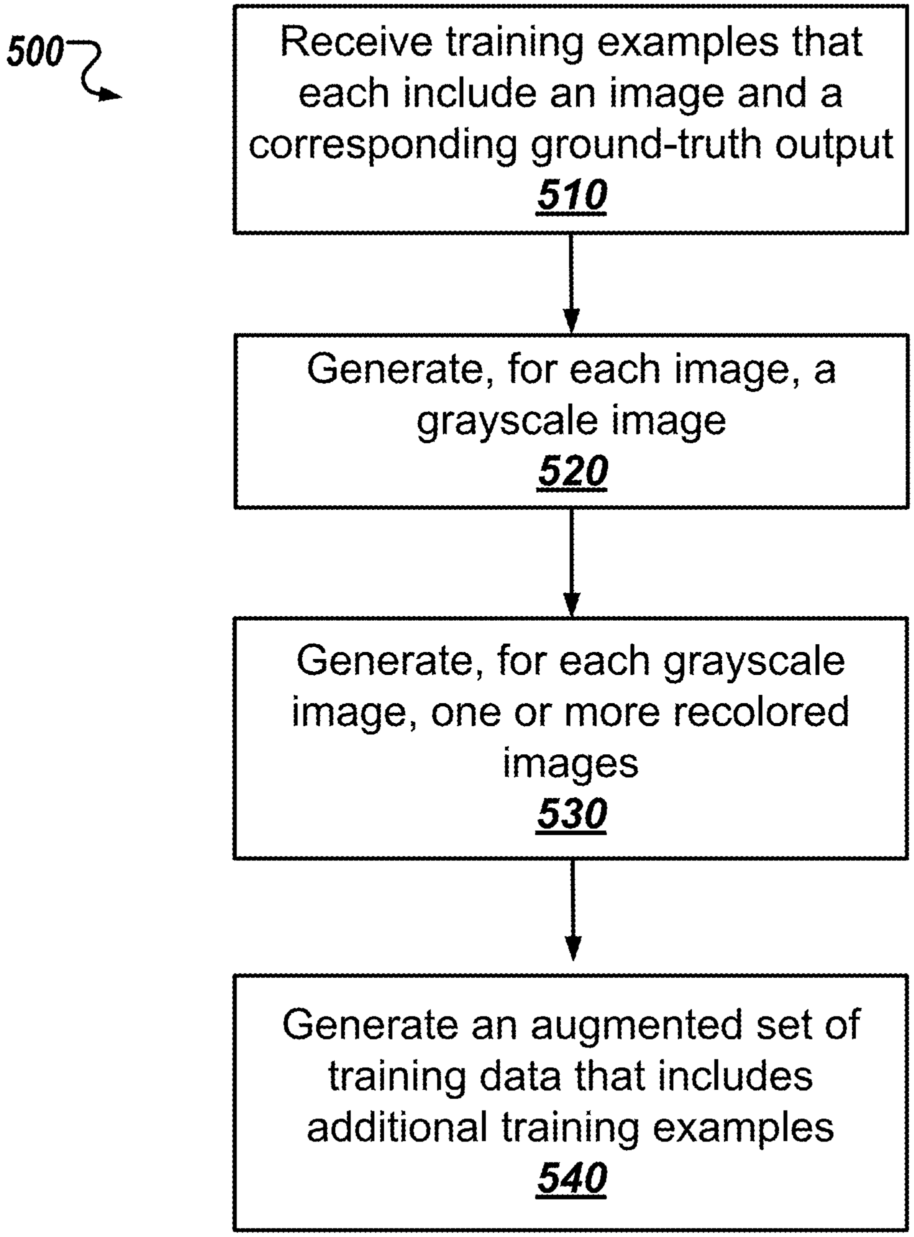
FIG. 5 is a flow diagram of an example process for generating an augmented set of training data.

FIG. 5 is a flow diagram of an example process 500 for generating an augmented set of training data. For convenience, the process 500 will be described as being performed by a system of one or more computers located in one or more locations. For example, a system for generating an augmented set of training data, e.g., the system 100 of FIG. 1, appropriately programmed in accordance with this specification, can perform the process 500.

The system receives training examples that each include an image and a corresponding ground-truth output (step 510). The training examples can be used to train an image processing model. For example, the image processing model can be trained to perform image processing tasks such as image segmentation, object detection, object recognition, or image matting. The image processing model can include, for example, a convolutional neural network (CNN) or a U-Net.

In some examples, the image can be a synthetic image. For example, the synthetic image can be a rendered image.

The image is in a first colorization scheme. For example, the image can be an RGB image in the RGB colorization scheme.

The system generates, for each image, a grayscale image (step 520). The grayscale image is a grayscale version of the image and is in the grayscale colorization scheme. For example, the system can combine multiple intensity values for each pixel of the image into a single grayscale value. The system can generate the grayscale image using the grayscale values for the pixels of the image.

In some examples, the system generates, for each image, a modified image that is in another colorization scheme that is different from the first colorization scheme such as a hyperspectral, multispectral, or infrared image.

The system generates, for each grayscale image, one or more recolored images (step 530). Each of the recolored images can be different colored versions of the grayscale image. In some examples, each of the recolored images can have different levels of brightness or contrast compared to the grayscale image and the image of the training example.

The system can generate the one or more recolored images using one or more colorization models. Each of the one or more colorization models can be an image-to-image generative model such as a neural network configured to perform an image-to-image translation task. For example, each of the colorization models can be an image-to-image diffusion model such as Palette, a CNN, or an image-to-image generative adversarial network.

Each of the one or more colorization models can have been trained on training data that includes real images. For example, each training example of the training data can include a grayscale real image and a colorful real image. The grayscale real image can have been generated from the colorful real image.

In some examples, the system can generate multiple recolored images for a particular grayscale image. Each of the multiple recolored images can have different colors. For example, the system can sample from the one or more colorization models given the particular grayscale image.

In some implementations, the one or more colorization models can include a sequence of colorization models. For each grayscale image, the system can generate an initial recolored image using the first colorization model in the sequence given a first grayscale image derived from the grayscale image. For each subsequent colorization model in the sequence, the system can provide an input recolored image and an intermediate grayscale image derived from the grayscale image to the subsequent colorization model to generate an intermediate recolored image. The input recolored image can be generated as output by a preceding colorization model in the sequence. Each of the subsequent colorization models can generate images of a corresponding resolution. The intermediate grayscale image for each of the subsequent colorization models can have the corresponding resolution. The system can use the intermediate recolored image generated by the last colorization model of the sequence as a recolored image to include in an additional training example. Generating a recolored image using a sequence of colorization models is described in more detail above with reference to FIG. 3.

The system generates an augmented set of training data that includes additional training examples (step 540). Each additional training example can include a recolored image generated from an image of a training example, and the corresponding ground-truth output for the image. In examples where the system generates multiple recolored images for a particular grayscale image, the system can generate an additional training example for each of the multiple recolored images. For example, each additional training example can include one of the recolored images generated from an image of a training example, and the corresponding ground-truth output for the image.

In some implementations, the augmented set of training data also includes the multiple training examples. That is, the augmented set of training data includes the received training examples and the generated additional training examples.

In some implementations, the system further trains the image processing model on the augmented set of training data. For example, the system can provide the augmented set of training data to a training system to train the image processing model.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework or a Jax framework.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

In addition to the embodiments described above, the following embodiments are also innovative:

Embodiment 1 is a method comprising:

receiving a plurality of training examples for training an image processing model, each training example comprising an image and a corresponding ground-truth output for the image;

generating, for each image, a respective grayscale image;

generating, for each respective grayscale image, one or more recolored images using one or more colorization models; and generating an augmented set of training data for training the image processing model that comprises a plurality of additional training examples, each additional training example comprising a respective recolored image generated from a respective image and the corresponding ground-truth output for the respective image.

Embodiment 2 is the method of embodiment 1, further comprising training the image processing model on the augmented set of training data.

Embodiment 3 is the method of any of embodiments 1-2, wherein the augmented set of training data further comprises the plurality of training examples.

Embodiment 4 is the method of any of embodiments 1-3, wherein each image comprises a synthetic image.

Embodiment 5 is the method of embodiment 4, wherein the synthetic image comprises a rendered image.

Embodiment 6 is the method of any of embodiments 1-5, wherein each of the one or more colorization models comprises an image-to-image diffusion model.

Embodiment 7 is the method of any of embodiments 1-6, wherein generating, for each respective grayscale image, one or more recolored images using one or more colorization models comprises:

generating each of the one or more recolored images by sampling from the one or more colorization models given the respective grayscale image.

Embodiment 8 is the method of any of embodiments 1-7, wherein the one or more colorization models comprise a sequence of colorization models, and wherein generating, for each respective grayscale image, one or more recolored images using one or more colorization models comprises:

for each respective grayscale image:

generating an initial recolored image using a first colorization model in the sequence of colorization models given a first grayscale image derived from the respective grayscale image; and for each subsequent colorization model in the sequence of colorization models:

providing an input recolored image and a respective intermediate grayscale image derived from the respective grayscale image for the subsequent colorization model as input to the subsequent colorization model to generate a respective intermediate recolored image, wherein the input recolored image is generated as output by a preceding colorization model in the sequence, and wherein the one or more recolored images comprise the respective intermediate recolored image generated by a last colorization model of the sequence of colorization models.

Embodiment 9 is the method of embodiment 8, wherein each subsequent colorization model generates images of a corresponding resolution, and wherein the respective intermediate grayscale image for the subsequent colorization model has the corresponding resolution.

Embodiment 10 is the method of any of embodiments 1-9, wherein the one or more colorization models have been trained on training data comprising real images.

Embodiment 11 is the method of any of embodiments 1-10, wherein the image processing model performs an image processing task comprising any one or more of: image segmentation, object detection, or object recognition.

Embodiment 12 is a system comprising:

one or more computers; and one or more storage devices storing instructions that, when executed by the one or more computers, cause the one or more computers to perform the method of any one of embodiments 1 to 11.

Embodiment 13 is one or more computer-readable storage media storing instructions that when executed by one or more computers cause the one or more computers to perform the method of any one of embodiments 1 to 11.

While this specification contains many specific implementation details, these should not be construed as limitations on the scope of any invention or on the scope of what can be claimed, but rather as descriptions of features that can be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features can be described above as acting in certain combinations and even initially be claimed as such, one or more features from a claimed combination can in some cases be excised from the combination, and the claimed combination can be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing can be advantageous.

What is claimed is:

1. A computer-implemented method comprising:

receiving a plurality of training examples for training an image processing model, each training example comprising a synthetic image and a corresponding ground-truth output for the synthetic image;

generating, for each synthetic image, a respective grayscale image;

generating, for each respective grayscale image, one or more recolored images using one or more colorization models, wherein each colorization model is different than the image processing model; and generating an augmented set of training data for training the image processing model that comprises a plurality of additional training examples, each additional training example comprising a respective recolored image generated from a respective synthetic image and the corresponding ground-truth output for the respective synthetic image.

2. The method of claim 1, further comprising training the image processing model on the augmented set of training data.

3. The method of claim 1, wherein the augmented set of training data further comprises the plurality of training examples.

4. The method of claim 1, wherein the synthetic image comprises a rendered image.

5. The method of claim 1, wherein each of the one or more colorization models comprises an image-to-image diffusion model.

6. The method of claim 1, wherein generating, for each respective grayscale image, one or more recolored images using one or more colorization models comprises:

generating each of the one or more recolored images by sampling from the one or more colorization models given the respective grayscale image.

7. The method of claim 1, wherein the one or more colorization models comprise a sequence of colorization models, and wherein generating, for each respective grayscale image, one or more recolored images using one or more colorization models comprises:

for each respective grayscale image:

generating an initial recolored image using a first colorization model in the sequence of colorization models given a first grayscale image derived from the respective grayscale image; and for each subsequent colorization model in the sequence of colorization models:

providing an input recolored image and a respective intermediate grayscale image derived from the respective grayscale image for the subsequent colorization model as input to the subsequent colorization model to generate a respective intermediate recolored image, wherein the input recolored image is generated as output by a preceding colorization model in the sequence, and wherein the one or more recolored images comprise the respective intermediate recolored image generated by a last colorization model of the sequence of colorization models.

8. The method of claim 7, wherein each subsequent colorization model generates images of a corresponding resolution, and wherein the respective intermediate grayscale image for the subsequent colorization model has the corresponding resolution.

9. The method of claim 1, wherein the one or more colorization models have been trained on training data comprising real images.

10. The method of claim 1, wherein the image processing model performs an image processing task comprising any one or more of: image segmentation, object detection, or object recognition.

11. A system comprising:

one or more computers; and one or more storage devices storing instructions that, when executed by the one or more computers, cause the one or more computers to perform operations comprising:

receiving a plurality of training examples for training an image processing model, each training example comprising a synthetic image and a corresponding ground-truth output for the synthetic image;

generating, for each synthetic image, a respective grayscale image;

generating, for each respective grayscale image, one or more recolored images using one or more colorization models, wherein each colorization model is different than the image processing model; and generating an augmented set of training data for training the image processing model that comprises a plurality of additional training examples, each additional training example comprising a respective recolored image generated from a respective synthetic image and the corresponding ground-truth output for the respective synthetic image.

12. The system of claim 11, wherein the operations further comprise training the image processing model on the augmented set of training data.

13. The system of claim 11, wherein the augmented set of training data further comprises the plurality of training examples.

14. The system of claim 11, wherein the synthetic image comprises a rendered image.

15. The system of claim 11, wherein each of the one or more colorization models comprises an image-to-image diffusion model.

16. The system of claim 11, wherein generating, for each respective grayscale image, one or more recolored images using one or more colorization models comprises:

generating each of the one or more recolored images by sampling from the one or more colorization models given the respective grayscale image.

17. The system of claim 11, wherein the one or more colorization models comprise a sequence of colorization models, and wherein generating, for each respective grayscale image, one or more recolored images using one or more colorization models comprises:

for each respective grayscale image:

generating an initial recolored image using a first colorization model in the sequence of colorization models given a first grayscale image derived from the respective grayscale image; and for each subsequent colorization model in the sequence of colorization models:

providing an input recolored image and a respective intermediate grayscale image derived from the respective grayscale image for the subsequent colorization model as input to the subsequent colorization model to generate a respective intermediate recolored image, wherein the input recolored image is generated as output by a preceding colorization model in the sequence, and wherein the one or more recolored images comprise the respective intermediate recolored image generated by a last colorization model of the sequence of colorization models.

18. One or more non-transitory computer-readable storage media storing instructions that when executed by one or more computers cause the one or more computers to perform operations comprising:

receiving a plurality of training examples for training an image processing model, each training example comprising a synthetic image and a corresponding ground-truth output for the synthetic image;

generating, for each synthetic image, a respective grayscale image;

generating, for each respective grayscale image, one or more recolored images using one or more colorization models, wherein each colorization model is different than the image processing model; and generating an augmented set of training data for training the image processing model that comprises a plurality of additional training examples, each additional training example comprising a respective recolored image generated from a respective synthetic image and the corresponding ground-truth output for the respective synthetic image.

19. The system of claim 17, wherein each subsequent colorization model generates images of a corresponding resolution, and wherein the respective intermediate grayscale image for the subsequent colorization model has the corresponding resolution.

20. The system of claim 11, wherein the one or more colorization models have been trained on training data comprising real images.

* * * * *